United States Patent [19]

Lordi et al.

[11] 4,335,037
[45] Jun. 15, 1982

[54] BLEND OF STYRENE-MALEIC ANHYDRIDE AND HIGH IMPACT POLYSTYRENE

[75] Inventors: Frank E. Lordi, West Chester; Peter S. Francis, Rose Valley, both of Pa.

[73] Assignee: Atlantic Richfield Company, Los Angeles, Calif.

[21] Appl. No.: 247,689

[22] Filed: Mar. 26, 1981

[51] Int. Cl.³ .................... C08L 51/00; C08K 3/40
[52] U.S. Cl. ................................. 524/504; 525/71
[58] Field of Search .................. 525/71; 260/42.18

[56] References Cited

U.S. PATENT DOCUMENTS

| | | | |
|---|---|---|---|
| 4,097,550 | 6/1978 | Haaf et al. | 525/71 |
| 4,108,925 | 8/1978 | Lee | 525/71 |
| 4,113,797 | 9/1978 | Lee | 525/71 |

Primary Examiner—Paul Lieberman
Assistant Examiner—Herbert J. Lilling

[57] ABSTRACT

A blend having advantageous toughness and impact resistance is prepared by hot working of a mixture of from about 5 to about 25% of a high impact polystyrene containing from about 4 to about 16% rubber, said high impact polystyrene having an average molecular weight which is significantly higher than the average molecular weight of the hereafter described styrene-maleic anhydride resin and about 95 to 75% of a styrene-maleic anhydride resin containing from about 80 to 94% styrene, from about 5 to 15% maleic anhydride, and from about 1 to about 5% rubber. The blend is especially useful in molding fiber-reinforced articles. The blend has outstanding toughness when green. That is, hot and freshly molded articles can be removed from the mold with minimized breakage, thus decreasing the amount of scrap arising from the breakage of a green molded item at the time of being ejected and/or removed from a mold.

2 Claims, No Drawings

BLEND OF STYRENE-MALEIC ANHYDRIDE AND HIGH IMPACT POLYSTYRENE

RELATED APPLICATION

Reference is made to the simultaneously filed application of F. E. Lordi and J. Triplett, Ser. No. 247,690 concerned with a Method of Preparing Styrene-Maleic Anhydride Molding Compositions by dissolving high impact polystyrene in styrene prior to copolymerization with maleic anhydride.

FIELD OF INVENTION

This invention relates to blends having advantageous toughness for minimizing the amount of breakage of green, freshly molded articles at the time of their removal from a mold.

PRIOR ART

When an article is molded, the macromolecular organic structural material must be placed in the molding machine, and subjected to appropriate heat and pressure to cause the flowing of the plastic material into all portions of the mold. The molding process necessarily involves a cooling time subsequent to the filling of the mold and prior to the removal of the green article from the mold. The term "green" is applied to the freshly molded article to distinguish it from the article subsequent to adequate cooling to ambient temperature and/or the other transformations attributable to adequate aging at ambient temperature of the molded article. It has long been known that the green strength of a molded article was less than that of the article after adequate aging at ambient temperature. The cycle of cooling within the mold is desirably controlled for a time sufficient that most of the articles develop sufficient green strength to be withstanding the strains of removal from the mold and/or storage during the time that the green article is awaiting the next step in the manufacturing operation.

The likelihood of articles being broken when being removed from a mold has been affected by the shape of the article, the shape of the mold, and the extent to which the article tends to cling to the mold because of the absence, in appropriate portions of the mold, of adequate tapering relative to the direction of withdrawal of the molded article. There is a greater likelihood of breakage if the green article has a propensity to grip the uniform dimensions of cylindrical protrusions as distinguished from the ease of withdrawing from a conical surface.

Some molded articles contain a controlled amount of an inorganic fiber material such as metal fibers or glass fiber as a reinforcement member. Such fiber reinforced articles can have greater toughness, advantageous impact resistance, and superior heat resistance attributable to such fiber reinforcement. The propensity for breakage of green articles containing glass fiber is oftentimes greater than for articles lacking such reinforcement, inasmuch as the presence of the glass fibers tends to minimize the elasticity of the green article while it is being pulled away from the mold. The green strength of a glass fiber-reinforced article tends to be less and the scrap rate attributable to breakage of the green article tends to be greater than for an article lacking glass fibers.

Resins featuring styrene-maleic anhydride are employed in lieu of other resins in part by reason of their propensity to withstand higher use temperatures without tendencies toward softening or melting, and in part because such resins have a cost advantage among high heat resistant resins.

High impact polystyrenes (HIPS) contain measurable amounts, such as 4% to 16%, preferably 6% to 10%, of rubber grafted as blocks onto the styrene chains. HIPS are distinguished particularly by having a higher molecular weight than the styrene-maleic anhydride resin with which HIPS is blended in accordance with the present invention. A process of exhaustive polymerization of suspended beads may lead to HIPS. The molecular weight of the HIPS must be more than 20% higher than the molecular weight of the rubber modified styrene-maleic anhydride resin. Such high molecular weight of the HIPS is believed to impart a toughness to the composition of the green article. The grafted rubber component of the HIPS might also have a contributing influence in maintaining some degree of elasticity within the freshly formed green article at the time that it is being removed from a mold. However, the blend functions far better than using styrene-maleic anhydride resins containing larger amounts of rubber, thus indicating that the improved green strength is not attributable merely to rubber content. Moreover, the blend is cheaper than the styrene maleic anhydride resins containing large amounts of rubber.

Various blends of plastic have been prepared and used for the molding of articles for many years. However, the general rule is that plastics are insoluble in each other. Any discovery of a blend having the capacity to make resin mixtures which can function satisfactorily as a molding composition is a relatively rare exception inasmuch as the general rule still prevails for the insolubility of one plastic in another.

The search has been going on over a very long period of time for a molding composition having an appropriate conbination of properties permitting its use in molding articles with a minimized breakage of the freshly molded articles when the cooling cycle is maintained at a rate that is fast enough to be of commercial operability. Notwithstanding the continued effort to seek for appropriate blends, prior technologists were not able to solve the problem of providing at an appropriate cost a molding composition having the advantages of high heat stability and excellent toughness in the green condition whereby the articles can be molded with a minimized breakage of the green articles.

SUMMARY OF THE INVENTION

In accordance with the present invention, a blend is prepared consisting of from about 95 to 75% of styrene-maleic anhydride resin containing about 80 to 94% styrene, about 5 to 15% maleic anhydride, and from 1 to 5% rubber, said blend containing from about 5 to about 25% of high impact polystyrene having a molecular weight at least 20% greater than the molecular weight of said styrene-maleic anhydride-rubber resin, said high impact polystyrene containing from about 4 to 16%, preferably 6 to 10% rubber, and about 84 to 96%, preferably 90 to 94% polystyrene.

The nature of the invention is further clarified by reference to a plurality of examples:

EXAMPLE 1

An extruder is provided with dies for extruding strands and with knives so that the strands are cut into pellets. Two varieties of pellets of molding composition, together with minor amounts (generally aggregating less than 1%) of conventional additives such as lubricants (e.g. fatty acid) were supplied to the extruder. The mixture was melted, worked, masticated, and blended in the extruder to provide extruder pellets which met a set of desiderata which had not previously been met.

The blend consisted of:

| A. | Styrene-maleic anhydride-rubber resin | 90 |
|----|----------------------------------------|-----|
| B. | High impact polystyrene resin | 10 |
| C. | conventional additives | 0.5 |

Said resin A is an interpolymer of 89% styrene, 8% maleic anhydride, and 3% rubber. The resin B is a grafted copolymer of 92% styrene and 8% block rubber, said resin having a molecular weight about 60% greater than resin A. The extruder operated at conditions such that the molten mixture entering the orifices of the dies was at a temperature of about 625° F. The extruder strands and sliced pellets cooled quickly to a temperature cooler than 200° F., whereby the pellets could be handled without distortion.

The thus prepared pellets of the blend are transferred to a molding machine, and there mixed with about 15% glass fibers. The mixture is molded to provide an article having an advantageous set of properties. Products are removed from the mold with only a trivial breakage rate, notwithstanding the 15% glass fiber content. The outstanding green strength of the molding composition makes it far more advantageous than the unmodified styrene-maleic anhydride-rubber resin. In a control process, significant breakage of the articles is very troublesome in molding such 15% glass fiber articles using said resin A.

EXAMPLE 2

An equimolar mixture of xylene and cyclohexanone is employed to dissolve a sample of resin A consisting of an interpolymer of 80% styrene, 15% maleic anhydride and 5% rubber at 280° F. The same hot solvent is employed to dissolve a sample of resin B consisting of an interpolymer of 96% styrene and 4% rubber, such high impact polystyrene having a molecular weight about 40% greater than that of resin A. The two solutions are thoroughly mixed in proportions aimed at providing a blend of 75% A and 25% B, and the blended resin is precipitated at room temperature by the controlled addition of pentane. Particles of the thus blended resin are supplied to a molding machine, together with 20% fibers of aluminum, and molded into a heat conducting shroud. The molded articles have outstanding green strength, so that the breakage upon removal from the mold, is not excessive. Reliability of green strength is particularly important for articles featuring costly fiber reinforcements not readily recycled through the molding machine.

Although solvent blending produces blends having utility, the hot-working of the mixture, as in a Banbury mixer or extruder, is much more advantageous because of cost and engineering factors. Because the products are so nearly the same whether the blend is prepared using an extruder or solvent, the mutual solubility of resins A and B throughout the $[A]_{0.75-0.95}$ $[B]_{0.05-0.25}$ range was established with greater ease. The critical property of adequate green strength of fiber-reinforced articles was established for extruder blends containing from 5 to 25% of HIPS.

EXAMPLE 3

An injection molding machine has a barrel with a reciprocating screw. Such machine has a hopper accepting a molding composition consisting of particles such as resin pellets. The pellets are subjected to hot working whereby resin A is adequately blended with resin B to provide a molding composition having high green strength. Glass fibers about 3/16 inch long are supplied to the hopper and are dispersed throughout the blend during the hot working, the glass fibers constituting about 20% by weight of the resin blend. After sufficient mixture has been prepared and stored temporarily in barrel, the molding composition is injected into the mold with sufficient pressure to fill the mold. In any injection molding process, there is a cooling period after mold-filling and prior to article removing. If the cooling period is excessive, then the molding process can be excessively costly. The green article, comprising glass fiber reinforced blend, has adequate green strength, as evidenced by a series of moldings without breakage.

The resin A is an interpolymer of 94% styrene, 5% maleic anhydride, and 1% rubber. The resin B is a high impact polystyrene having a molecular weight about 21% greater than that of resin A, and contains 84% styrene and 16% rubber. The hopper is supplied with a resin mixture previously prepared in a sloped rotary blending mixer to consist of 95% resin A pellets and 5% resin B pellets, plus about 0.05% lubricants, plus about 20% glass fibers.

EXAMPLES 4-6

Using the extruding and molding equipment of Example 1, blends of resin A and resin B are prepared and employed for preparing articles having glass fiber reinforcement. The green articles have acceptable green strength, thus avoiding the breakage which ordinarily complicates production of glass fiber reinforced articles. Data relating to compositions are shown in Table 1.

TABLE 1

| Example | % A | % S | % MA | % Rub | % B | % S | % Rub |
|---------|-----|-----|------|-------|-----|-----|-------|
| 4 | 80 | 90 | 8 | 2 | 20 | 90 | 10 |
| 5 | 85 | 85 | 11 | 4 | 15 | 94 | 6 |
| 6 | 78 | 88 | 10 | 2 | 12 | 92 | 8 |

By a series of tests is was established that the blend should contain 5-25% of HIPS (hence 75-95 of styrene-maleic-rubber resin A) and that the molecular weight of the HIPS should be at least 20% greater than that of resin A.

EXAMPLE 7

Using the apparatus of Example 2, a series of articles featuring 10% glass fiber reinforcement were prepared to evaluate the relationship between mold temperature and temperature of the melted molding composition when cooling the mold for 75 seconds. If the mold temperature is too low, or if the melt temperature is too low, then broken articles are likely to occur because of inadequate green strength of the freshly formed article. The data permitted preparation of a family of curves for different compositions, each curve showing the lower limits if excessive breakage was to be avoided. By molding at temperatures above the thus determined limits for a particular composition, lower breakage can be attained. Differences in the green strengths of different compositions can be grouped to establish orders of magnitude amongst compositions. Thus a blend of 10% high impact polystyrene (containing 8% rubber, and having a very high molecular weight) and 90% styrene maleic anhydride resin containing 8% MA but no rubber had a zone of adequate green strength which required a melt temperature about 24° F. hotter and a mold temperature about 45° F. hotter than the blend of the present invention. The styrene-maleic anhydride-rubber resin (resin A of the present invention) similarily required significantly higher temperatures for both melt temperature and the mold temperature than the blend of the present invention. However, the blend of the present invention had more advantageous combinations of mold temperature and melt temperature, than a significant variety of resins and resin blends. By a series of tests, it was established that in the molding of articles containing from about 10% to about 20% glass fiber reinforcement, the blend of the present invention was outstanding in achieving high green strength in comparison with a variety of molding resins and resin blends.

Various modifications of the invention are possible without departing from the scope of the appended claims.

The invention claimed is:

1. A molding composition of a hotworked blend of A and B as follows:
   A. from about 75 to 95% of a styrene-maleic anhydride interpolymer resin consisting essentially of the product of copolymerizing
      (a) from about 80 to about 94% styrene
      (b) from about 5 to about 15% maleic anhydride, and,
      (c) from about 1 to about 5% rubber;
   B. from about 5 to 25% of a high impact polystyrene consisting of a radial block graft interpolymer of alkadiene and styrene, the alkadiene contact being from about 4 to 16% and the styrene content being from about 84 to 96%, and the average molecular weight of such high impact polymer being at least 20% greater than the molecular weight of said styrene-maleic anhydride interpolymer resin said blend having outstanding green toughness, whereby molded parts are removed from molds with less breakage than for some conventional molding compositions lacking high impact polystyrene, said blended composition having heat resistance superior to conventional molding compositions lacking the maleic anhydride component.

2. The molding composition of claim 1 containing glass fiber reinforcements.

* * * * *